United States Patent
Rodriguez et al.

(10) Patent No.: US 6,347,616 B1
(45) Date of Patent: Feb. 19, 2002

(54) SOLENOID VALVE FOR A VEHICLE CARBON CANISTER

(75) Inventors: Lorenzo Guadalupe Rodriguez, Juarez; Luis A. Flores-Mena; Alberto Alcantara, both of Juarez Chih, all of (MX); Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/567,933

(22) Filed: May 10, 2000

(51) Int. Cl.[7] ............................................. F02M 33/02
(52) U.S. Cl. ................................. 123/520; 251/129.15
(58) Field of Search ................................. 123/516, 518, 123/519, 520; 251/129.22; 137/546, 549

(56) References Cited

U.S. PATENT DOCUMENTS

| | | | | |
|---|---|---|---|---|
| 1,920,925 A | * | 8/1933 | Jucheim et al. | 251/129.22 |
| 5,150,879 A | * | 9/1992 | Mullally | 251/129.15 |
| 5,178,116 A | * | 1/1993 | Fehrenbach et al. | 123/518 |
| 5,183,022 A | * | 2/1993 | Cook | 123/516 |
| 5,429,099 A | * | 7/1995 | Deland | 123/520 |
| 5,450,833 A | * | 9/1995 | Denz et al. | 123/516 |
| 5,582,205 A | * | 12/1996 | McCarty et al. | 137/546 |
| 5,809,977 A | * | 9/1998 | Krimmer et al. | 123/516 |

* cited by examiner

Primary Examiner—Thomas N. Moulis
(74) Attorney, Agent, or Firm—Margaret A. Dobrowitsky

(57) ABSTRACT

The Solenoid Valve For A Vehicle Carbon Canister includes a housing with an outlet end and a inlet end. A portion of the inlet end of the housing extends around an inlet port formed in the inlet end to create an air inlet tube. Inserted in the outlet end of the housing is an end cap formed with an outlet port. The end cap extends around the outlet port to form an air outlet nipple having an internal portion and an external portion. Formed around the internal portion of the air outlet nipple is an annular cavity. Disposed within the housing is a solenoid mechanism slightly smaller than the housing to form an annular air passage having sufficient area to provide the proper air flow, but also having a thickness small enough to prevent carbon particles from passing through the annular air passage. A continuous air passage is formed by the air inlet tube, the annular air passage, and the air outlet nipple. A plunger is included to block the flow of air through the air outlet nipple. When the plunger is in the open position, the internal geometry of the present invention, such as the thickness of the annular air passage and the drastic increase in volume between the annular air passage and the annular cavity, minimizes contamination by carbon particles.

10 Claims, 1 Drawing Sheet

SOLENOID VALVE FOR A VEHICLE CARBON CANISTER

FIELD OF THE INVENTION

The present invention relates generally to devices used to control the flow of petroleum fuel vapors between a carbon canister and a combustion engine.

BACKGROUND OF THE INVENTION

In order to comply with state and federal environmental regulations, most motor vehicles are now equipped with a carbon canister installed to trap and store petroleum fuel vapors from the carburetor bowl and/or the fuel tank. With the canister, fuel vapors are not vented to the atmosphere, but are instead trapped in the canister and then periodically purged from the canister into the engine where they are burned along with the air-fuel mixture. A solenoid valve is typically used to control purging of the carbon canister.

It happens that the carbon canister solenoid valves can be adversely affected by airborne carbon particles traveling through the system with the petroleum fumes. More specifically, carbon particles can block full closure of the valves and cause leakage and test fail on the "On Board Diagnostic" (OBD) within the motor vehicle.

The common way to solve the carbon contamination problem is to install a filter at the inlet of the solenoid valve, e.g., an eight-tenths millimeter (0.8 mm) mesh filter to trap the larger carbon particles. Unfortunately, as understood herein, these filters need to be cleaned or replaced many times during the life of the solenoid valve to avoid blocking the flow of air through the valve. Moreover, the present invention recognizes that an eight-tenths millimeter mesh filter will not collect smaller particles that can also cause leakage and diagnostic failure.

In light of the above problems, the present invention recognizes a need for a device for controlling the purging of a carbon canister that will minimize contamination by larger carbon particles.

SUMMARY OF THE INVENTION

A solenoid valve for a vehicle carbon canister includes a housing that has an outlet port, a cylindrical housing wall and an inlet port. Within the housing is a solenoid mechanism that establishes an annular air passage between the solenoid mechanism and the housing wall. The solenoid valve also includes an air inlet tube that extends away from the inlet port of the housing and communicates with the annular air passage. Furthermore, an outlet nipple that has an internal portion extends inwardly from the outlet port, such that it establishes an annular cavity between the internal portion of the outlet nipple and the housing. This annular air cavity communicates with the annular air passage and as petroleum fumes pass through the valve the annular air cavity traps carbon particles. The solenoid mechanism has a plunger within that moves to selectively block the flow of air through the air outlet nipple.

As envisioned in the particularly preferred embodiment set forth below, the annular air passage has a thickness between five hundred and eight hundred microns. Moreover, the solenoid valve has an inlet end that forms the inlet port and at least one hole that has an electrode disposed therein. The electrode connects to the solenoid mechanism and provides power to the coil. Finally, in the preferred embodiment, the housing extends outwardly around the hole in the inlet end and forms a female socket.

In another aspect, the solenoid valve for a vehicle carbon canister includes a hollow housing that has an outlet end, a cylindrical housing wall, and an inlet end that forms an inlet port. Within the hollow housing is a cylindrical solenoid mechanism. An end cap that forms an outlet port is also disposed in the outlet end of the housing. The addition of the solenoid mechanism within the solenoid valve of the present invention forms an annular air passage between the solenoid mechanism and the hollow housing.

The end cap forms an air outlet nipple that has an internal portion and an external portion that extends inwardly and outwardly around the outlet port. With this structure, the air outlet nipple forms an annular cavity between the internal portion of the air outlet nipple and the hollow housing. Fluid communication between the air inlet tube, the annular air passage, and the air outlet nipple forms a continuous air passage and as petroleum fumes pass through the valve, the annular cavity receives carbon particles that are present in the fumes. Finally, this aspect of the present invention includes a valve that selectively blocks the flow of air through the continuous air passage.

In still another aspect, a solenoid valve for a vehicle carbon canister includes a housing that forms an inlet port and an outlet port. Also, the housing includes a continuous side wall. A solenoid mechanism is in the housing, and an annular air passage is established between the solenoid mechanism and the housing wall. The air passage has a width of between five hundred microns and eight hundred microns, and the passage communicates with the ports in the housing.

As set forth in greater detail below, this aspect of the solenoid mechanism includes a plunger that is movable between an open position, wherein the outlet port is not blocked and purge air communicates with the carbon canister, and a closed position, wherein the outlet port is blocked. An outlet nipple is juxtaposed with the outlet port, and the nipple includes an internal portion that is at least partially surrounded by the housing wall such that a cavity is established between the internal portion of the nipple and the housing wall. With this structure, at least some particles in air that flows from the inlet port to the outlet port through the annular air passage are held in the particle-holding cavity.

BRIEF DESCRIPTION OF THE DRAWINGS

The novel features of this invention, as well as the invention itself, both as to its structure and its operation, will be best understood from the accompanying drawings, taken in conjunction with the accompanying description, in which reference characters refer to similar part, and in which.

DETAILED DESCRIPTION OF THE PREFERRED EMBODIMENTS

Figure 2:
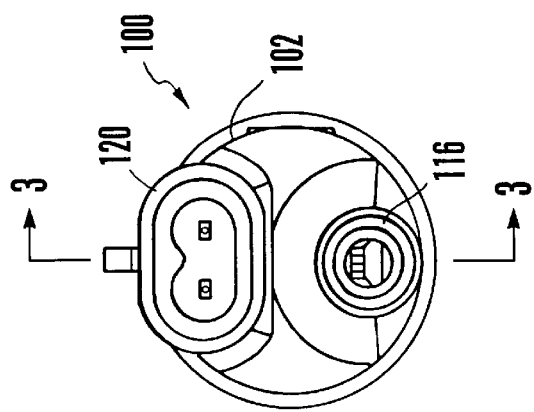
FIG. 2 is a front plan view of the Solenoid Valve For A Vehicle Carbon Canister of the present invention.
Figure 1:
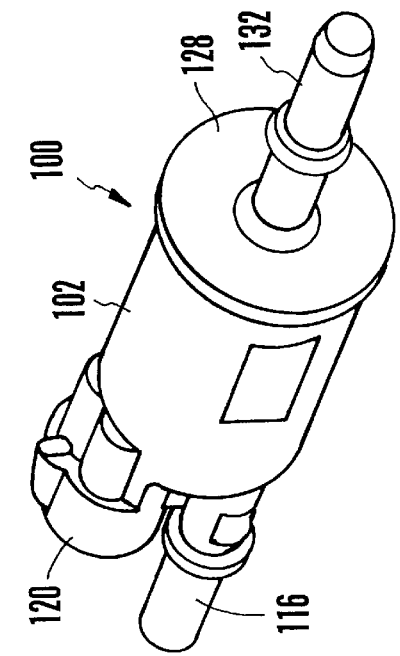
FIG. 1 is a perspective view of the Solenoid Valve For A Vehicle Carbon Canister of the present invention.
Figure 3:
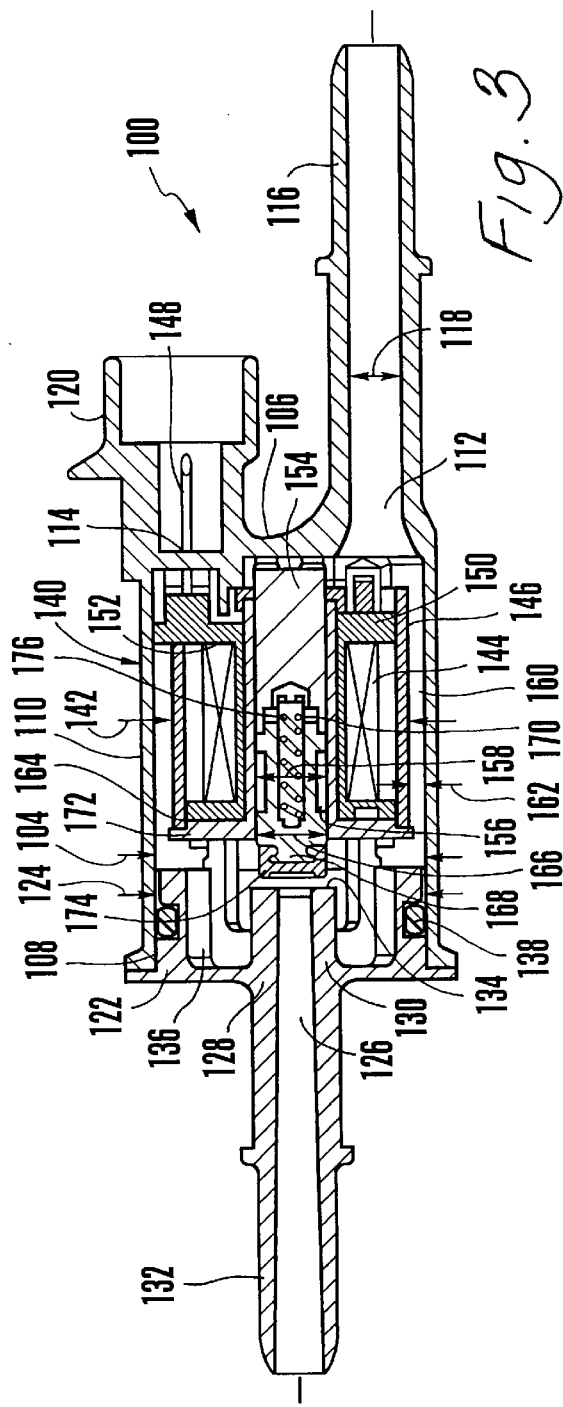
FIG. 3 is a cross sectional view of the Solenoid Valve For A Vehicle Carbon Canister of the present invention taken along line 3—3 in FIG. 2.

Referring initially to FIG. 1, the solenoid valve for a vehicle carbon canister of the present invention is shown and generally designated 100. FIGS. 2 and 3 show that the solenoid valve for a vehicle carbon canister 100 includes a hollow housing 102 having an internal diameter 104. The hollow housing 102 further includes a inlet end 106, an outlet end 108, and a cylindrical housing wall 110.

Formed in the inlet end 106 is an inlet port 112, a first electrode hole 114, and a second electrode hole (not shown). The electrode holes 114 and (not shown) are formed adjacent to each other opposite the inlet port 112. A portion of the inlet end 106 extends perpendicularly around the inlet port 112 to form an air inlet tube 116 having an internal diameter 118. In a preferred embodiment, the air inlet tube 116 may sized to be inserted into a standard air inlet hose (not shown).

FIG. 3 shows that the inlet end 106 also establishes a female socket 120 around the electrode holes 114 and (not shown). The female socket 120, in a preferred embodiment, may be sized and configured to receive a male electrical connector (not shown).

FIG. 3 further shows that an end cap 122 with an external diameter 124 covers the outlet end 108 of the hollow housing 102. In a preferred embodiment, the external diameter 124 of the end cap 122 may be sized in such a manner that will allow it to be press fitted into the outlet end 108 of the hollow housing 102.

Still, referring to FIG. 3, the end cap 122 is formed with an outlet port 126. A portion of the end cap 122 extends perpendicularly around the outlet port 126 to form an air outlet nipple 128 having an internal portion 130 and an external portion 132. The interior face of the internal portion 130 of the air outlet nipple 128 serves as a disk-shaped valve seat 134, and established between the internal portion 130 of the air outlet nipple 128 and the hollow housing 102 is an annular cavity 136. In a preferred embodiment, an "O" ring 138 is installed between the end cap 122 and the hollow housing 102. Additionally, the external portion 132 of the air outlet nipple 128 is configured to fit into a typical air outlet hose (not shown).

FIG. 3 also shows that a cylindrical solenoid mechanism 140 is disposed within the hollow housing 102. The cylindrical solenoid mechanism 140 has an external diameter 142 and it includes a coil 144 that is surrounded by an external metal sleeve 146. A pair of electrodes 148, each passing through a respective electrode hole 114 and (not shown), are connected to the coil 144 to provide power to it. Also included in the cylindrical solenoid mechanism 140 is a plastic spool 150 which insulates the coil 144 from the other components within the cylindrical solenoid mechanism 140. Within the coil 144 is an internal metal sleeve 152 which surrounds a plunger support 154 and which forms a hollow cylindrical plunger guide 156 having an internal diameter 158.

Preferably, the external diameter 142 of the cylindrical solenoid mechanism package 140 is sufficiently smaller than the internal diameter 104 of the hollow housing 102 so that an annular air passage 160 with a thickness 162 is formed between the cylindrical solenoid mechanism 140 and the hollow housing 102. In a preferred embodiment, the thickness 162 of the annular air passage 160 may be between five hundred and eight hundred microns (500–800 microns).

FIG. 3 shows a hollow cylindrical plunger 164, with an external diameter 166, a closed end 168, and an open end 170 reciprocatingly disposed within the plunger guide 156. In a preferred embodiment the external diameter 166 of the plunger 164 may be slightly smaller than the internal diameter 158 of the plunger guide 156. This configuration will allow the plunger 164 to travel freely back and forth within the plunger guide 156 between a closed position, wherein the end 168 of the plunger 164 mates with the valve seat 134 to block the outlet port 126, and the open position shown, wherein the end 168 is distanced from the valve seat 134 and the outlet port 126 is not blocked.

Attached to the inlet end 168 of the plunger 164 is a plunger collar 172 and a valve cap 174. FIG. 3 shows the plunger collar 172 is installed radially around the closed end 168. The valve cap 174 is installed on the closed end 168 of the plunger 164 between the plunger 164 and the air outlet nipple 128. The plunger 164 is aligned with the air outlet nipple 128, and in a preferred embodiment, to provide the best seal, the valve cap 174 may be steel with a rubber face. Also, in a preferred embodiment, the plunger collar 172 may be made from steel or any other material sensitive to magnetic forces.

When the coil 144 within the cylindrical solenoid mechanism 140 is energized, the magnetic force of the coil 144 will attract the plunger collar 172 and draw it toward the coil 144 and causing the plunger 164 to move within the plunger guide 156 to the open position shown in FIG. 3. This motion will release the valve cap 174 from the valve seat 134 and open the air outlet nipple 128. The solenoid valve for a vehicle carbon canister 100 will stay open as long as the coil 144 is energized.

A spring 176 is installed in compression within the plunger 164 between the plunger seat 152 and the closed end 168 of the plunger 164. When the coil 144 within the cylindrical solenoid mechanism 140 is de-energized, the spring 176 returns the plunger 164 to the closed position, with the valve cap 174 pressed tightly against the valve seat 134, and block the flow of air through the solenoid valve for a vehicle carbon canister 100. The solenoid valve for a vehicle carbon canister 100 will remain closed as long as the coil 144 remains de-energized.

In a preferred embodiment, the spring constant of the spring 176 is chosen so that the closure force of the spring 176 will be greater than the force of the air pressure on the plunger collar 172. This will keep the plunger 164 in the closed position (not shown) when the coil 144 is de-energized. However, the spring constant is also chosen so that the magnetic force of the coil 144 will overcome the spring force when the coil 144 is energized and keep the plunger 164 in the open position.

Referring again to FIG. 3, when the plunger 164 is in the open position, fluid communication is established from the air inlet tube 116, through the annular air passage 160, and out the air outlet nipple 128. Accordingly, the petroleum fumes can enter the solenoid valve for a vehicle carbon canister 100 through the air inlet tube 116, but large carbon particles will not be able to pass through the annular air passage 160. Moreover, due to the sudden expansion of the continuous air passage, the flow of the petroleum fumes will decelerate at the interface between the annular air passage 160 and the annular cavity 134, thereby causing smaller carbon particles remaining in the petroleum fumes to become trapped within the annular cavity 134.

While the particular SOLENOID VALVE FOR A VEHICLE CARBON CANISTER as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A solenoid valve for a vehicle carbon canister, comprising:
   a housing having an outlet port, a cylindrical housing wall and an inlet port;
   a solenoid mechanism within the housing;
   an annular air passage being established between the solenoid mechanism and the housing, the annular air passage having a thickness between five hundred and eight hundred microns;
   an air inlet tube extending away from the inlet port of the housing and communicating with the annular air passage;
   an outlet nipple including an internal portion extending inwardly from the outlet port, such that an annular cavity is established between the internal portion and the housing to trap particles therein, the outlet port and the annular air cavity communicating with the annular air passage; and
   a plunger within the solenoid mechanism, the plunger being movable to selectively block the flow of air through the air outlet nipple.

2. The solenoid valve of claim 1, wherein the inlet port is formed in an inlet end of the housing, and the inlet end is further formed with at least one hole having an electrode disposed therein and connected to said solenoid mechanism.

3. The solenoid valve of claim 2, further including a female socket formed by a portion of the housing extending outwardly around the hole.

4. A solenoid valve for a vehicle carbon canister, comprising:
   a hollow housing having an outlet end, a cylindrical housing wall, and a inlet end formed with an inlet port;
   a cylindrical solenoid mechanism within the hollow housing, an end cap disposed in the outlet end of the hollow housing, the end cap formed with an outlet port, an annular air passage formed between the solenoid mechanism and the hollow housing, the annular air passage having a thickness between five hundred and eight hundred microns;
   an air outlet nipple formed by a portion of the end cap and having an internal portion and an external portion respectively extending inwardly and outwardly around the outlet port formed in the end cap;
   an annular cavity formed between the internal portion of the air outlet nipple and the hollow housing;
   a continuous air passage formed by the annular air passage and the air outlet nipple, the annular cavity receiving particles from air flowing through the continuous air passage; and
   a plunger selectively blocking the air flow through the continuous air passage.

5. The solenoid valve of claim 4, further comprising an air inlet tube formed by a portion of the inlet end of the hollow housing extending outwardly and perpendicularly around the inlet port.

6. The solenoid valve of claim 4, wherein the plunger includes a valve cap axially aligned with the air outlet nipple.

7. The solenoid valve of claim 4, wherein the inlet end of the hollow housing is further formed with at least one hole.

8. The solenoid valve of claim 7, further including a female socket formed by a portion of the inlet end of the hollow housing extending outwardly around the hole.

9. The solenoid valve of claim 8, further including at least one electrode passing through the hole for providing power to the solenoid mechanism.

10. A solenoid valve for a vehicle carbon canister, comprising:
   a housing forming an inlet port and an outlet port, the housing including a cylindrical housing wall;
   a solenoid mechanism in the housing, an air passage being established between the solenoid mechanism and the housing wall and having a width between five hundred microns and eight hundred microns, the air passage communicating with the ports, the solenoid mechanism including a plunger movable between an open position, wherein the outlet port is not blocked and purge air communicates with the carbon canister, and a closed position, wherein the outlet port is blocked; and
   an outlet nipple juxtaposed with the outlet port and including an internal portion wall at least partially surrounded by the housing wall such that a cavity is established between the internal portion of the outlet nipple and the housing wall, wherein at least some particles in air flowing from the inlet port to the outlet port through the air passage are held in the cavity.

* * * * *